(12) United States Patent
Sartin et al.

(10) Patent No.: US 9,186,288 B2
(45) Date of Patent: Nov. 17, 2015

(54) FRAME SYSTEM FOR STRETCHERED PERSONS

(71) Applicant: Aces Holdings, LLC, Archdale, NC (US)

(72) Inventors: Edward Lewis Sartin, Greensboro, NC (US); Edward Austin Sartin, Graham, NC (US); Christopher Thomas Sartin, High Point, NC (US)

(73) Assignee: ACES Holdings, LLC, Archdale, NC (US)

( * ) Notice: Subject to any disclaimer, the term of this patent is extended or adjusted under 35 U.S.C. 154(b) by 338 days.

(21) Appl. No.: 13/678,655

(22) Filed: Nov. 16, 2012

(65) Prior Publication Data
US 2014/0117063 A1 May 1, 2014

Related U.S. Application Data

(60) Provisional application No. 61/720,205, filed on Oct. 30, 2012.

(51) Int. Cl.
*B60R 7/00* (2006.01)
*A61G 3/08* (2006.01)
*B60R 11/00* (2006.01)

(52) U.S. Cl.
CPC ............ *A61G 3/0825* (2013.01); *B60R 7/00* (2013.01); *B60R 11/00* (2013.01); *Y10T 29/49716* (2015.01)

(58) Field of Classification Search
CPC .............................................. B60R 2011/0078
USPC ................. 224/547, 545; 248/200, 222.51; 29/401.1; 410/104
See application file for complete search history.

(56) References Cited

U.S. PATENT DOCUMENTS

| 974,159 | A | * | 11/1910 | Brusis | 294/133 |
| 2,216,243 | A | | 10/1940 | Kriedler | |
| 2,456,024 | A | | 12/1948 | Schofield | |
| 2,473,364 | A | * | 6/1949 | Dickinson et al. | 5/9.1 |
| 2,480,322 | A | * | 8/1949 | Cozzoli | 244/118.6 |

(Continued)

FOREIGN PATENT DOCUMENTS

| DE | 202010004581 U1 | 8/2010 |
| FR | 2631816 A1 | 12/1989 |

(Continued)

OTHER PUBLICATIONS

Patent abstract of Japan (JP Pub. No. 2002153512A); published May 28, 2002; 1 pg.

(Continued)

*Primary Examiner* — Justin Larson
*Assistant Examiner* — Lester L Vanterpool
(74) *Attorney, Agent, or Firm* — Womble Carlyle Sandridge & Rice, LLP

(57) ABSTRACT

A stretcher receiving system is provided for installation in an interior compartment of a vehicle, as well as a method of converting a vehicle to a stretchered passenger carrying vehicle. An example of the system includes a plurality of adjustable mounting assemblies, capable of being attached to an interior surface of the vehicle compartment. The mounting assemblies support an adjustable frame assembly which may have at least two vertical posts. Interconnecting these vertical posts is at least one stretcher receiver adapted to hold an end of a stretcher.

17 Claims, 6 Drawing Sheets

(56) References Cited

U.S. PATENT DOCUMENTS

| | | | |
|---|---|---|---|
| D172,219 S | 5/1954 | Califano | |
| 3,314,685 A | 4/1967 | Bothwell | |
| 3,358,300 A * | 12/1967 | Smith | 5/9.1 |
| 4,006,500 A * | 2/1977 | Bonifay | 5/625 |
| 4,093,303 A | 6/1978 | Nelson | |
| 4,251,100 A | 2/1981 | Rolandelli | |
| 4,295,679 A | 10/1981 | Artweger et al. | |
| 4,339,146 A | 7/1982 | Lehmann | |
| 4,378,128 A | 3/1983 | Holling et al. | |
| 4,397,432 A * | 8/1983 | Resetar | 244/118.6 |
| 4,425,978 A * | 1/1984 | Star | 180/243 |
| 4,570,733 A | 2/1986 | Star | |
| 4,672,296 A | 6/1987 | Griffin | |
| 4,824,158 A | 4/1989 | Peters | |
| 5,178,432 A | 1/1993 | Zeman | |
| 5,372,339 A | 12/1994 | Morgan | |
| 5,383,629 A * | 1/1995 | Morgan | 244/118.6 |
| 5,490,703 A | 2/1996 | Hewko | |
| 5,497,968 A | 3/1996 | Hewko | |
| 5,509,710 A | 4/1996 | Eavenson, Sr. et al. | |
| 5,755,478 A | 5/1998 | Kamlya et al. | |
| 5,755,479 A | 5/1998 | Lavin et al. | |
| 5,775,758 A | 7/1998 | Eberspacher | |
| 5,779,296 A | 7/1998 | Hewko | |
| 5,813,629 A * | 9/1998 | Cabrera | 244/118.6 |
| 6,039,377 A | 3/2000 | Eberspacher | |
| 6,082,799 A | 7/2000 | Marek | |
| 6,175,717 B1 | 1/2001 | Rebec et al. | |
| 6,179,358 B1 | 1/2001 | Hirayama et al. | |
| 6,254,159 B1 | 7/2001 | Wieczorek et al. | |
| 6,571,882 B2 | 6/2003 | Yen | |
| 6,688,664 B2 | 2/2004 | Sioutis | |
| 6,798,343 B2 | 9/2004 | Carrier et al. | |
| 6,916,056 B2 | 7/2005 | Mitchell et al. | |
| 6,929,061 B2 | 8/2005 | Lajeunesse | |
| 7,028,351 B1 * | 4/2006 | Frieder et al. | 5/118 |
| 7,095,210 B2 | 8/2006 | Tamura | |
| 7,111,340 B2 | 9/2006 | Mitchell | |
| 7,182,396 B2 | 2/2007 | Taylor | |
| 7,188,880 B1 | 3/2007 | Frieder | |
| 7,284,381 B2 | 10/2007 | Edwards et al. | |
| 7,328,926 B1 | 2/2008 | Myers et al. | |
| 7,360,813 B2 | 4/2008 | Ting et al. | |
| 7,530,403 B2 | 5/2009 | Cano | |
| 7,540,546 B2 | 6/2009 | Kern et al. | |
| 7,883,133 B2 * | 2/2011 | Chinn | 296/19 |
| 7,931,321 B2 * | 4/2011 | Kapoor | 296/19 |
| 8,104,814 B2 | 1/2012 | Sartin et al. | |
| 8,146,975 B2 | 4/2012 | Kapoor | |
| 8,366,167 B2 | 2/2013 | Sartin et al. | |
| 8,746,771 B1 * | 6/2014 | Farber | 296/19 |
| 2003/0057323 A1 * | 3/2003 | Keogh | 244/118.5 |
| 2003/0102685 A1 | 6/2003 | Sioutis | |
| 2004/0080172 A1 | 4/2004 | Mitchell | |
| 2004/0120798 A1 * | 6/2004 | Davis et al. | 414/268 |
| 2005/0225107 A1 | 10/2005 | Mitchell | |
| 2006/0137886 A1 | 6/2006 | Cano | |
| 2007/0075557 A1 | 4/2007 | Frieder | |
| 2007/0102946 A1 | 5/2007 | Blackwell et al. | |
| 2008/0004663 A1 | 1/2008 | Jorgenson | |
| 2008/0264708 A1 | 10/2008 | Grange et al. | |
| 2009/0072105 A1 * | 3/2009 | Cramer | 248/226.11 |
| 2009/0218108 A1 | 9/2009 | Cano | |
| 2010/0052351 A1 * | 3/2010 | Sartin et al. | 296/20 |
| 2011/0089124 A1 | 4/2011 | Chinn | |
| 2011/0115245 A1 | 5/2011 | Engelbrecht et al. | |
| 2011/0259614 A1 | 10/2011 | Steeg et al. | |
| 2012/0006873 A1 * | 1/2012 | Chinn | 224/545 |

FOREIGN PATENT DOCUMENTS

| | | |
|---|---|---|
| JP | 2001353185 A | 12/2001 |
| JP | 2005200016 A | 7/2005 |
| JP | 2006175031 A | 7/2006 |
| WO | 9927881 A1 | 6/1999 |
| WO | 2005120896 A2 | 12/2005 |

OTHER PUBLICATIONS

Patent abstract of Japan (JP Pub. No. 200469399A); published Mar. 4, 2004; 9 pgs.

Patent abstract of Japan (JP Pub. No. 2007111139A); published May 10, 2007; 1 pg.

International Search Report and Written Opinion (PCT/US2007/083757); published May 29, 2008; 7 pgs.

"Countering International Terrorism: The United Kingdom's Strategy," HM Government, pp. 1-38, Jul. 2006 (http://www.cabinetoffice.gov.uk/security_and_intelligence/community.aspx).

"Giant Medgadget: Mercedes Bus-Based Ambulance," medGadget, pp. 1-5; May 18, 2006; (http://medgadget.com/archives/2006/05/giantmedgadget1.html, as of Sep. 8, 2008).

Response Systems, LLC—Disaster Preparation, web pp. 1-4 (Sep. 2, 2009); web pp. 1-12 (Apr. 22, 2008); 16 pgs. total.

Letter and enclosures dated Feb. 15, 2012, from Art MacCord of MacCord Mason to Robert D. Mason, Jr., of Womble Carlyle Sandridge & Rice, regarding ACES Holdings LLC's lawsuit against Matthews Specialty Vehicles, Inc., for alleged patent infringement of U.S. Pat. No. 8,104,814; 61 pgs.

Complaint and exhibit regarding *ACES Holdings, LLC* v. *Matthews Specialty Vehicles, Inc.*, the United States District Court for the Middle District of North Carolina, Case #: 1:12-cv-00103, filed Jan. 31, 2012; 29 pgs.

Hackney Emergency Response Vehicle Solutions information sheet regarding Mobile Air and Light Vehicle, VT Hackney, www.rescueleader.com/rescue/products/mbl.air.htm, copyright 2008; 2 pgs.

Tyco/Scott Health and Safety sheet regarding Hackney NCR Mobile Air Unit, Scott Health and Safety, copyright 2005; 2 pgs.

* cited by examiner

FRAME SYSTEM FOR STRETCHERED PERSONS

CROSS REFERENCE TO RELATED APPLICATIONS

This application claims the benefit of U.S. provisional application Ser. No. 61/720,205, filed Oct. 30, 2012, the disclosure of which is hereby incorporated by reference in its entirety and for all purposes.

BACKGROUND

Ambulances are able to carry only a very small number of patients (generally only one or two). This limitation makes it cumbersome and time-consuming to transport all the victims or patients that have treatment or evacuation needs when a mass casualty event or disaster occurs, or a mass evacuation of patients is required. Currently, when such an event occurs, many ambulances are called to transport the victims, and, given the limited number of ambulances generally available within a given geographic area, the total number of patients that can be transported and treated is limited. Furthermore, if all conventional ambulances are used for transport, people in other coverage areas might suffer because ambulances are not available to handle other emergencies.

Large vehicles specially outfitted to carry multiple persons have been developed to respond to these large scale events. The budgets of local, state, federal and private emergency response agencies, however, have been reduced, or not funded at all. This restricts the ability of these entities to afford the cost associated with the purchase of a large specially configured vehicle.

Many municipalities have school buses and multiple passenger buses that have the capacity to carry large numbers of persons. These vehicles, however, do not have the ability to carry non-ambulatory, prone persons. These vehicles also lack the ability to carry injured persons who may need continued treatment or monitoring during transportation.

There remains a need, therefore, for a system and method whereby a large truck or bus can be converted to transport a plurality of non-ambulatory persons. The ability to convert or retrofit existing equipment with a stretcher transportation system can lead a cost-effective method of providing increased capabilities to providers. Such a system must be adaptable to fit various interior wall and ceiling dimensions and shapes to permit a secure installation.

SUMMARY OF THE INVENTION

One exemplary aspect of this disclosure involves a stretcher receiving system which can be installed in an interior compartment, such as inside of a vehicle. The system may include a plurality of adjustable mounting assemblies, capable of being attached to an interior surface of the vehicle compartment; an adjustable frame assembly, having at least two vertical posts, supported by said mounting assemblies; and one or more stretcher receivers interconnecting said vertical posts and adapted to receive an end of a stretcher.

Another exemplary aspect of this disclosure involves a vehicle for transporting a plurality of patients on stretchers. The vehicle may include one or more interior compartments; a plurality of adjustable mounting assemblies attached to an interior surface of the vehicle compartment; a first adjustable frame assembly, having at least two vertical posts, supported by said mounting assemblies; and one or more stretcher receivers interconnecting said vertical posts and adapted to receive an end of a stretcher.

A third exemplary aspect of this disclosure involves a method for converting a vehicle into an ambulance or carrier for the transportation of a plurality of stretchered persons. The method may include the steps of providing a vehicle; removing pre-existing installations in the area designated for installation of at least one adjustable frame assembly; attaching at plurality of mounting assembly along the ceiling of the compartment; attaching to the mounting assembly the at least one adjustable frame assembly, the adjustable frame assembly having at least two vertical posts; attaching the at least one adjustable frame assembly to a floor of the vehicle; and installing stretcher receivers on the vertical posts.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

DETAILED DESCRIPTION OF THE INVENTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Referring now in greater detail to the drawings, this disclosure relates to a stretcher receiving system that may be adaptively installed in an interior compartment of a vehicle, such as a bus, van, truck, or airplane to allow for transportation of a large number of stretchered patients. Alternatively, the stretcher receiving system may be installed in other interior compartments such as the room of a building. The disclosure also covers a kit comprised of the elements which make up the system, a vehicle having the system installed and a method for the conversion of a vehicle by installing the described system. Finally, the disclosure discloses novel components and elements used as part of the system and method.

The use of "stretchered patients" or "stretchered persons" herein is intended to also cover persons who require a stretcher for at least a limited time. Such persons include without limitation injured persons; persons needing respite or rehabilitation, such as fire fighters; persons needing monitoring; and deceased persons.

This disclosure relates to a frame system for receiving stretchered persons. The disclosure also relates to a kit made up of the parts used to form the frame system and a vehicle with the frame system installed. The system is designed to be installed in buses, trucks, planes or other relatively large vehicles having an interior compartment, so that the compartment becomes capable of transporting a large number of stretchered patients. However the system can be installed in any interior compartment, such as the room of a building. The system can include an adjustable mounting assembly which allows the frame to be securely attached to vehicle compartments of varied wall curvature. The frame system also provides vertical adjustability so that the system may be accommodated within vehicle compartments of varied floor to ceiling clearance. Further, the frame system provides adjustability in a horizontal dimension in order for the system to selectively accommodate stretchers of more than one length, since military stretchers are often longer than their civilian counterparts.

Figure 1:
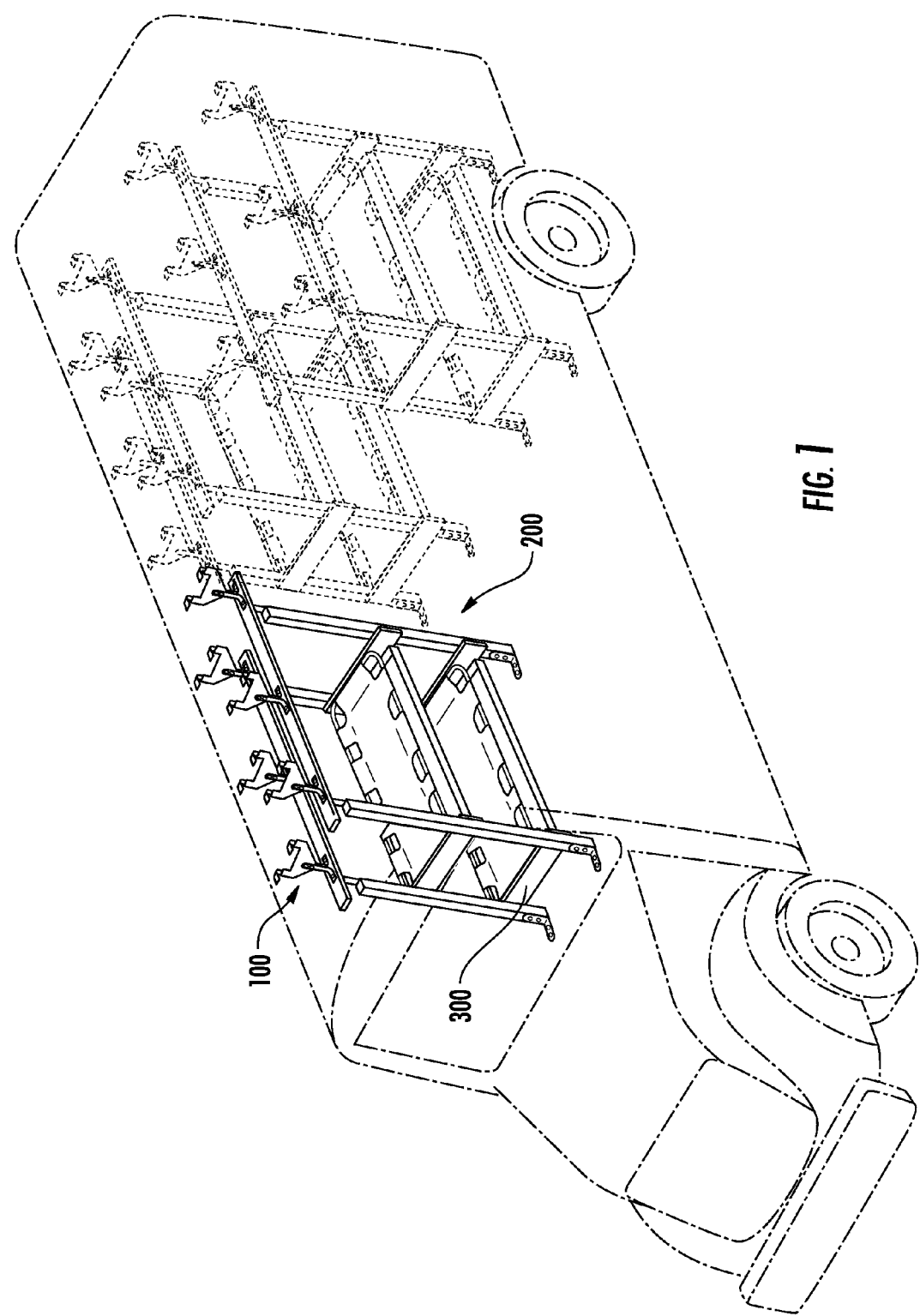
FIG. 1 shows a bus with multiple stretcher receiving systems installed in accordance with an exemplary embodiment.
Figure 2:
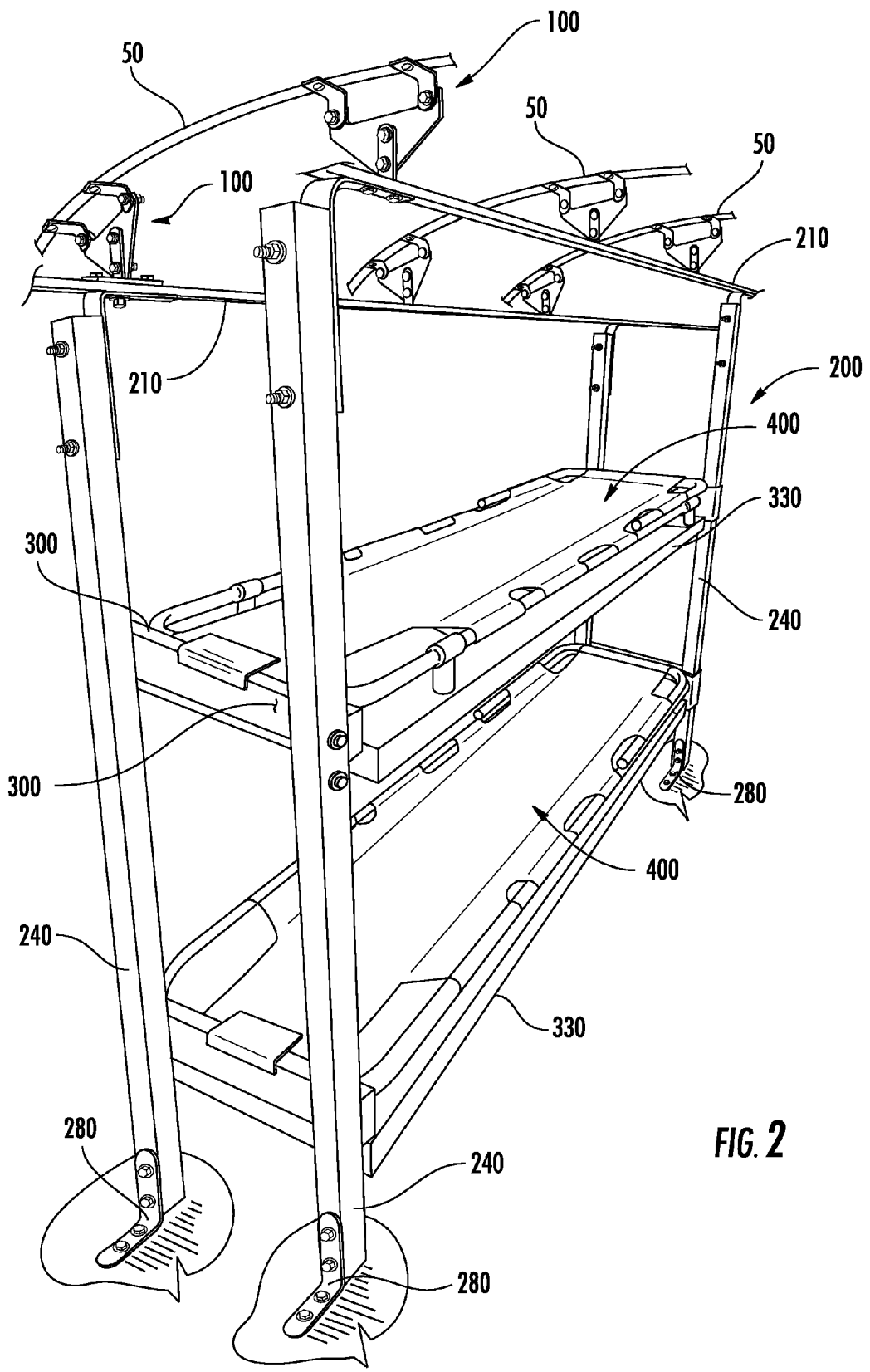
FIG. 2 shows an exemplary embodiment of the stretcher receiving system.

As seen in FIGS. 1 and 2, the stretcher receiving system may include one or more mounting assemblies 100, one or more adjustable frame assemblies 200, and one or more stretcher receivers 300. The stretcher receiving system may be installed in duplicate on opposite sides of a vehicle compartment. The systems on each side of the vehicle create an aisle running the length vehicle in which the care takers are able to tend to the patients. A plurality of systems can also be installed running along the same side of a vehicle. They can be spaced apart or set end-to-end, and thereby reducing the number of necessary components. When systems are installed on opposite sides of the compartment, each receiving system is independently attached to the interior compartment of the vehicle without relying upon an interconnection between the opposite systems to provide structural support. In this way, the full height of the aisle is kept clear of frame assembly or other system elements, providing improved workspace for the caretakers. The system is able to be securely attached without introducing additional obstacles over head which might cause injury to the caretakers.

Mounting Assembly

Figure 3:
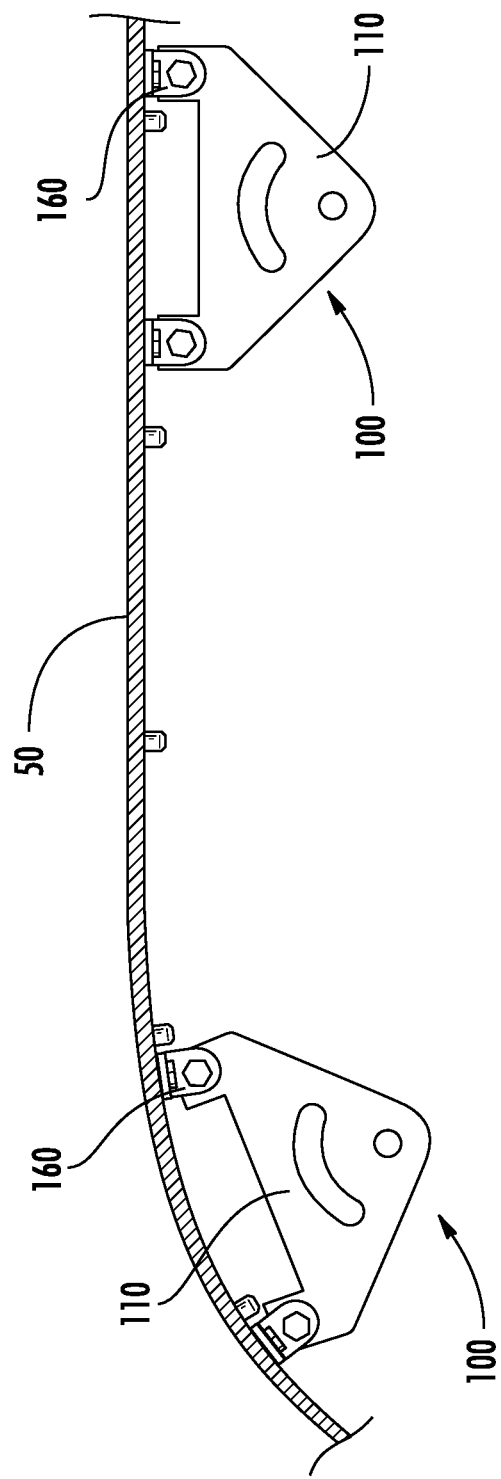
FIG. 3 is a detailed front view of an exemplary mounting assembly.
Figure 4:
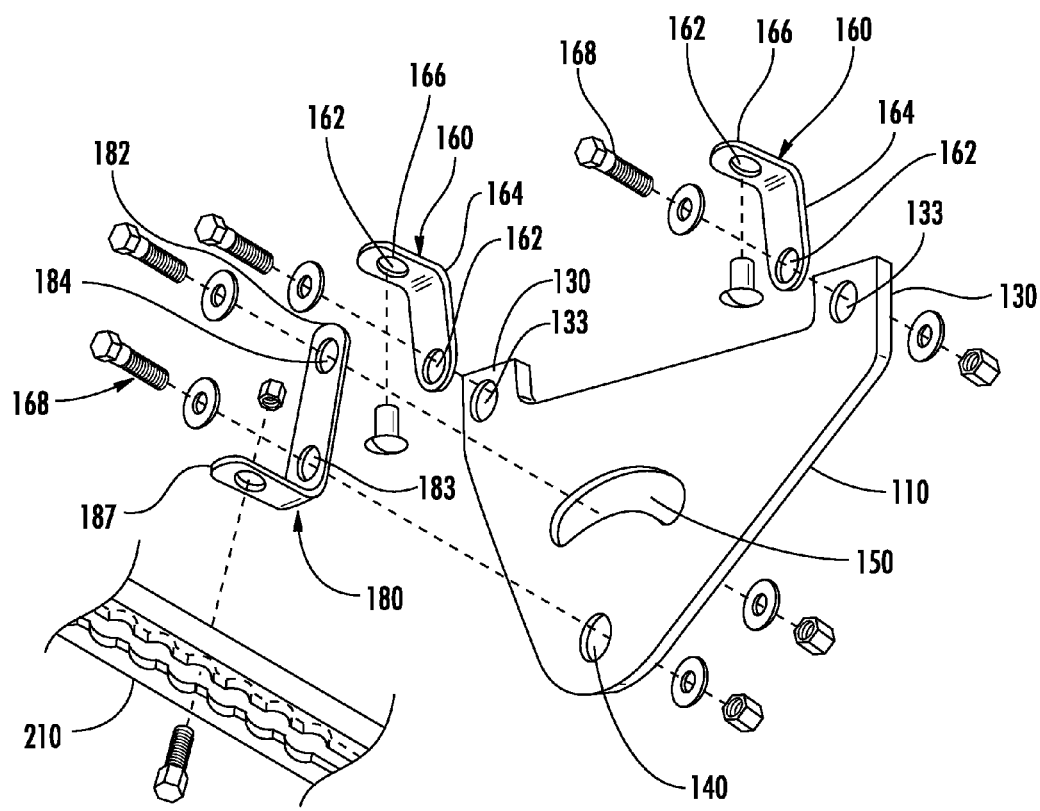
FIG. 4 is an exploded perspective view of the mounting assembly of FIG. 3.

An example of one of the mounting assemblies 100 is shown in FIGS. 3 and 4. The design of the mounting bracket assembly provides the ability for a securement track 210, or any other elements attached thereto, to be securely and properly positioned at the desired angle, for example parallel to the floor of the vehicle compartment, even if the surface on which the mounting assembly is attached is not parallel to the floor or includes a curved surface.

The mounting assembly 100 can include a substantially triangular bracket 110. One side of the bracket 110 can include one or more ear portions 130 extending perpendicularly from each distal end of said one side. In the embodiment shown, ear portions 130 are co-planar with the bracket 110. Each ear can be provided with a through-hole 133 that will act as one of three centers of rotation for the mounting assembly. The bracket 110 further comprises an additional through-hole 140 located adjacent to the corner of the triangular bracket which is opposite said one side. The bracket further includes an arc-shaped through-hole 150 whose arc is centered above the additional through-hole 140. The arc extends across a majority of the bracket 110 and sweeps an angle of at least about 60 degrees. Other arc angles also are contemplated under this disclosure. By providing a sufficient arc angle, the bracket 110 itself will include an opposite side of sufficient length to allow for attachment adjacent to surfaces of varied profiles and clearance between connectors 160.

The mounting bracket assembly can further include first and second connectors 160. In the embodiment shown, connectors 160 are, for example L-brackets, but other connectors as known in the art can also be used. In this example, each of said first and second connectors 160 includes at least one through-hole 162 in each of its leg portions. A first leg portion 164 of each of the first and second connectors 160 is connected to a respective one of the two ear portions using a fastener assembly 168 passing through their respective through-holes. The fastener assembly, for example, may comprise a bolt, at least one washer, and a nut, although other fastener types can be used. Each of said first and second connectors 160 is therefore able to pivot relative to the ears into the desired orientation prior to tightening the fastener assemblies. The desired orientation of the first and second connectors relative to the bracket will be determined by the curvature of the interior surface onto which the mounting assembly is being installed. This allows for the mounting assembly to be placed onto a large variety of surface configurations, both curved, and flat, generally vertical, as well as generally horizontal.

In the embodiment shown, connectors 160 include second leg portions 166 perpendicular to the first leg portions 164. The second leg portions 166 of the first and second L-brackets are to be secured to a support surface 50 (shown in FIGS. 2 and 3), for example a ceiling or wall, defined by the interior compartment. According to some embodiments of the installed mounting assembly, the second leg portions of the first and second L-brackets are each riveted to a support surface 50, a bow frame or another main vehicle structure. Attaching the mounting assembly to the bow frame allows for the stretcher receiving system to take advantage of the strongest members which form the interior compartment of the vehicle, while the bow frame is also made even more structurally sound by the addition of the stretcher receiving system. This structural strength in turn results in a more secure ride for the patients being transported.

The mounting assembly further comprises a third connector 180, for example a third L-bracket. Where the third connector comprises an L-bracket, the first leg portion 182 of the third L-bracket comprises an inner through-hole 183 and an outer through-hole 184 for attachment to the bracket. The inner through-hole 183 is aligned with and pivotally fastened to said additional through-hole 140 of the bracket, and the outer through-hole 184 is aligned with and pivotally fastened to the arc-shaped through-hole 150 in the bracket 110. Here again, the third connector 180 is able to pivot about the additional through-hole 140 while also being capable of being secured to the bracket 110 at two locations, which allows for the third connector 180 to be adjusted into the proper alignment, for example, with a second leg portion thereof 187 parallel with the floor of the vehicle compartment, yet held securely in place when the proper alignment has been achieved.

It should be further noted that all the corners of each element of the mounting assembly 100 are preferably rounded. Providing rounded corners decreases the risk of harm to the patient or caretaker.

The mounting assembly 100 can be manufactured from a wide variety of materials including but not limited to stainless steel, steel, aluminum, or any other suitable material that has the required strength.

Adjustable Frame Assembly

According to some embodiments of the invention, the mounting assembly 100 properly secures and positions the adjustable frame assembly 200 relative to the walls of the vehicle compartment.

Figure 5:
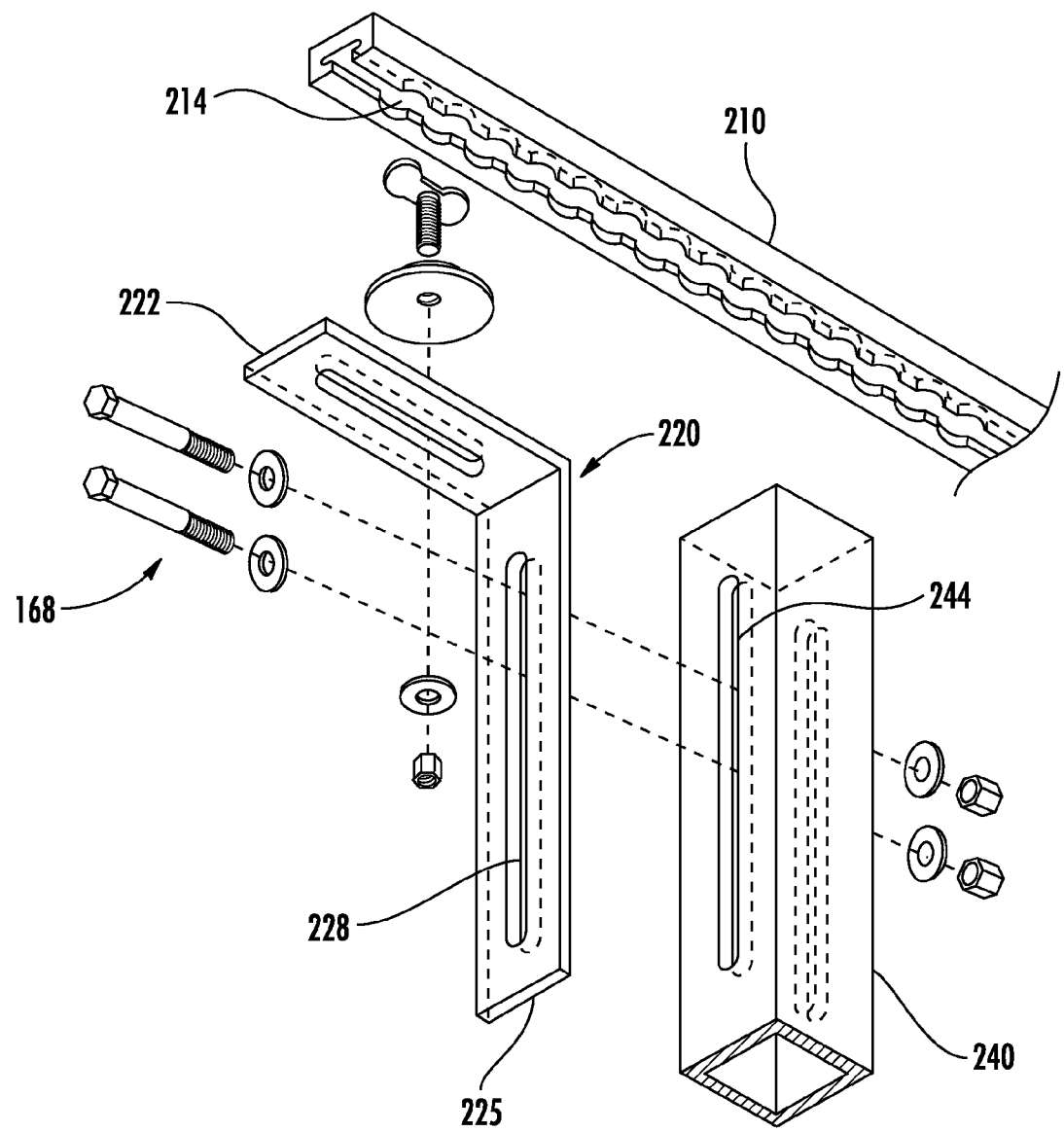
FIG. 5 is an exploded perspective view of the elements of an exemplary adjustable frame assembly as used in some embodiments of the stretcher receiving system.

The adjustable frame assembly 200 includes at least one securement track 210 as seen in FIGS. 1-2,4 and 6. As best seen in FIG. 5, the securement track 210 has a substantially rectangular C-shaped cross section with one side being flat and the opposite side including a groove 214 extending the length of the track. The groove 214 allows for fasteners positioned therein to be selectively positioned along the track, allowing for adjustability in the spacing between fasteners.

According to some embodiments of the present invention, the securement track 210 is hung by attaching the first side thereof to the second leg portion 187 of the third connector 180 of a first pair of spaced apart mounting assemblies 100 as best seen in FIG. 4. In one embodiment, the mounting assemblies which support the track are spaced apart in the direction of vehicle travel. In this embodiment, the track should be hung from the mounting assemblies such that the first and second sides of the track are parallel with the floor of the vehicle.

The adjustable frame assembly further comprises at least one connection bracket 220, as shown in FIG. 5, each connection bracket preferably having an L-shape with a first leg portion 222 which is connected to and selectively positioned along, the securement track 210.

The second leg portion 225 of each preferred connection bracket can comprise at least one elongated slot 228 running along the length of the second leg portion. At least one fastening assembly passes through the elongated slot 228 to connect each connection bracket 220 to a respective vertical post 240. The elongated slot 228 allows the second leg portion 225 of the connection bracket to translate, prior to tightening, relative to the vertical post 240. This translation allows for the stretcher receiving system to be installed into vehicle compartments with a variety of floor to ceiling clearance heights. In one embodiment as shown in FIG. 5, at least two fastening assemblies are used to secure the connection bracket to the vertical post. This will help to align the second leg portion of the connection bracket and the post. Proper alignment of these elements will prevent patient or care-taker exposure to shape edges or corners at this location.

The lower end of each vertical post may further include a floor bracket 280 as seen in FIG. 2. This floor bracket 280 includes a portion thereof which is capable of being fastened to the floor of the vehicle compartment. By securing the bottom of each vertical post 240 to the floor of the compartment, slipping between the floor and the posts can be prevented, increasing the strength of the frame assembly and decreasing the possible damage to the floor of the vehicle compartment.

Preferably, the stretcher receiving system, as shown in FIG. 1, comprises at least two pairs of mounting assemblies 100. The pairs are offset from one another in a direction perpendicular to the direction of vehicle travel and the elements of each pair offset from one another in a direction parallel to the direction of vehicle travel. The system further comprising at least two securement tracks 210, each track being supported by a respective pair of mounting assemblies 100. Each track supporting at least two connection brackets 220 (see FIG. 5) and vertical posts 240. The connection bracket/post combinations can be positioned to line up with respect to the two tracks and are adjusted to be spaced apart on each track based upon the length of the stretcher to be received. In other words, the system results in at least four vertical posts 240 which form the corners of a rectangle whose major axis has an adjustable length.

Figure 6:
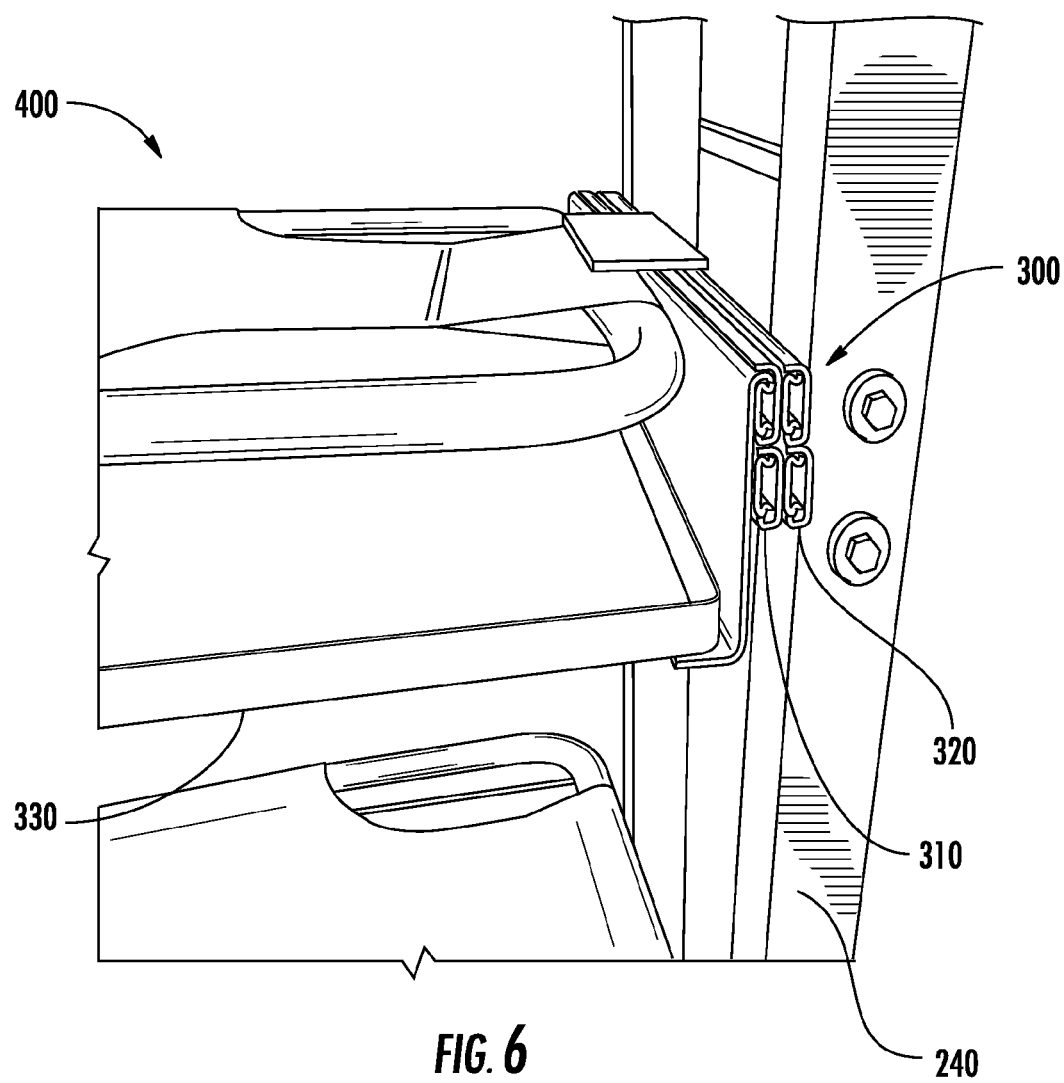
FIG. 6 is an exemplary detailed view of the stretcher receiver of FIGS. 1 and 2.

Across each set of aligned vertical posts 240, perpendicular to the direction of vehicle travel, is attached at least one stretcher receiver 300, as shown in FIG. 6 and further described below. Each stretcher receiver is designed to accept and securely hold the end of a stretcher. In one example of the present disclosure, the stretcher receivers have a portion which is able to slide relative to the posts 240.

In one example of the present disclosure, the stretcher receivers are fastened to the vertical posts. The vertical posts 240 may comprise pre-drilled holes, such as 244 in FIG. 5, for use when attaching the stretcher receivers. The pre-drilled holes may be positioned continuously along the vertical posts to allow the stretcher receivers to be positioned at substantially any height relative to each other and the floor. Alternatively, the pre-drilled holes may be positioned at select locations based upon the number of stretcher receivers to be stacked vertically along each post.

The elements of the frame assembly 200 can be manufactured from a wide variety of materials including but not limited to stainless steel, steel, aluminum, or any other suitable material that has the required strength.

Stretcher Receiver

An example of the sliding stretcher receiver 300 is shown in FIG. 6. The receiver 300 allows the stretchers 400 to be loaded onto an extendable translatable portion 310 which is able to translate relative to a fixed portion 320 attached to the vertical posts 240. The translatable portion 310 moves laterally between an extended position and a retracted position. Both positions are co-planar with one another. The stretcher receiver 300 can be manufactured from a wide variety of materials including but not limited to stainless steel, steel, aluminum, or any other suitable material that has the required strength.

The stretcher receiver 300 may also include a catch tray 330. The catch trays 330 are positioned to collect and drain any fluids coming from the stretchered person. The trays 330 prevent those fluids from falling upon a second stretchered person supported below a given stretcher receiver 300.

Conversion Kit

Another embodiment of the present invention involves a kit to be used to convert a conventional vehicle into a transport vehicle for many stretchered patients. The kit comprises a set of disassembled elements which can be installed into a new or pre-owned vehicle of an emergency response agency.

The conversion kit can include, a plurality of mounting assemblies 100 (the elements thereof provided collectively or individually), an adjustable frame assembly 200 and at least one stretcher receiver 300.

As discussed above, the frame assembly 200 may include at least one securement track 210, at least one connection bracket 220 and at least one vertical post 240.

The kit may further include at least one floor bracket 280 for securing the vertical post to the floor of the vehicle compartment.

The kit may further comprise the stretchers 400 for use in the frame assembly 200.

Preferably, the kit will include at least four mounting assemblies 100 to be secured to the inner walls of a compartment of the vehicle; at least two securement tracks 210 to be installed parallel to the floor of the compartment and running in the direction of vehicle travel; at least four connection brackets 220 and at least four vertical posts 240 to be hung from the securement tracks and form the corners of an imaginary rectangle into which a stretcher 400 can be received; and at least two stretcher receivers 300 for holding each end of the stretcher respectively.

The kits may have a fixed or adjustable quantity of each component. Therefore in order to construct a vehicle capable of receiving a large number of stretchered patients, the agency may purchase a plurality of kits, each kit with a fixed quantity of each element therein. Alternatively, the kit may be custom created to include the specific number of elements ordered by the purchaser or agency based on the size of the vehicle and maximum number of stretchered patients the vehicle will be used to transport.

The Method

A further embodiment of the present invention comprises the method of converting a conventional vehicle into a multi-patient ambulance using the described stretcher receiving system discussed above.

The method will be described in the preferred order of conversion steps, but it should be understood by one of ordinary skill in the art that the steps may be preformed in an alternative order within the scope of the present disclosure.

Begin by acquiring a vehicle to be converted. The vehicle can be acquired from an agency's current fleet, may be purchased new, may be purchased used or may be acquired by way of a gift from a charity or other municipality or agency.

Then, provide an open interior compartment within the vehicle large enough to accept the assembled stretching receiving system. In the case of a school bus conversion, this step will likely require the removal of some, or all, of the passenger seating.

The next step is to set up the stretcher receiving frame. This set up/installation may include, first, securing the mounting assembly or assemblies to the bow frame or other portion of the vehicle compartment interior. This is accomplished by fastening the second leg portion 166 of the first and second connectors 160 to said bow frame 50. The three connectors of each mounting assembly are then adjusted/rotated relative to the bracket 110 to place the third connector 180 in the desired orientation parallel to the floor of the vehicle compartment. The connectors can then be tightened relative to the bracket 110 or can be tightened after the remainder of the elements of the kit are installed.

Second, the securement track 210 is hung from the least one mounting assembly 100 to be parallel to the floor and parallel to the direction of travel of the vehicle. In some vehicles, a securement track may already be provided.

Third, the connection brackets 220 are attached to the securement track 210 and spaced along said track to accommodate a stretcher 400 of the desired length.

Fourth, the vertical posts 240 are attached to the connection brackets 220. The vertical posts 240 are positioned to rest on or near the floor of the vehicle compartment. The vertical posts are then fastened to the connection bracket at the proper location along the second leg 225 of the connection bracket to allow for the post to be positioned adjacent to the floor.

Fifth, floor brackets 280 may be used to fasten the bottom of each post 240 to the floor.

Sixth, a selected number of stretcher receivers 300 are attached between adjacent vertical posts 240 at the desired heights from the floor.

Seventh, each end of a stretcher 400 is placed into a respective stretcher receiver 300.

The method of installing the kit may include any or all of the steps discussed above. It should be contemplated that the kit may be presented to the buyer or agency in a variety of partially pre-assembled states all of which should be considered as within the scope of the present disclosure.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A stretcher receiving system for installation in an interior compartment of a vehicle, the system comprising:
   a plurality of adjustable mounting assemblies, capable of being attached to an interior surface of the vehicle compartment;
   an adjustable frame assembly, having at least two pairs of vertical posts, supported by said mounting assemblies; and
   one or more stretcher receivers interconnecting said vertical posts of each pair and adapted to receive an end of a stretcher,
   wherein the adjustable frame assembly comprises a pair of securement tracks attached to the mounting assemblies in a position parallel with the floor of the vehicle compartment; and
   a connection bracket slidably attaching each vertical post to one of the securement tracks,
   wherein said vertical posts extend down from the connection brackets and the securement tracks, and
   wherein the securement tracks allow for adjusting spacing between the pairs of vertical posts.

2. The system of claim 1, wherein each mounting assembly is capable of attachment in plural locations along said interior surface, whereby at least one of said vertical posts can be vertically mounted thereto in each location.

3. The system of claim 2, wherein the mounting assembly comprises a bracket and three connectors rotatably positionable with respect to said bracket.

4. The system of claim 3, wherein the bracket is substantially triangular, and comprises two ear portions protruding from opposite ends of one edge of the triangle;
   wherein each ear portion comprising a through-hole to provide a pivot connection with a first and second of said three connectors.

5. The system of claim 4, wherein the first and second connectors are attached to the bow frame of the vehicle.

6. A stretcher receiving system for installation in an interior compartment of a vehicle, the system comprising:
   a plurality of adjustable mounting assemblies, capable of being attached to an interior surface of the vehicle compartment;
   an adjustable frame assembly, having at least two vertical posts, supported by said mounting assemblies; and
   one or more stretcher receivers interconnecting said vertical posts and adapted to receive an end of a stretcher, wherein each mounting assembly is capable of attachment in plural locations along said interior surface, whereby at least one of said vertical posts can be vertically mounted thereto in each location, wherein the mounting assembly comprises a bracket and three connectors rotatably positionable with respect to said bracket, wherein the bracket is substantially triangular, and comprises two ear portions protruding from opposite ends of one edge of the triangle;

wherein each ear portion comprising a through-hole to provide a pivot connection with a first and second of said three connectors, wherein the first and second connectors are attached to the bow frame of the vehicle, wherein the bracket further comprises an additional through-hole positioned adjacent to the corner of said bracket opposite to said one edge; and an arc-shaped through-hole whose arc is centered around the additional through-hole;

wherein the additional through-hole and the arc-shaped through-hole provide a pivot point and guide slot for a third of said three connectors.

7. The system of claim 6, wherein the arc-shaped through-hole sweeps an angle of at least 60 degrees around said additional through-hole.

8. The system of claim 1, wherein the vertical posts are adjustably attached to the respective connection brackets such that an end of each post can be positioned at or on the floor of the vehicle compartment, regardless of compartment height.

9. The system of claim 1, wherein the vertical posts comprise a plurality of holes positioned along the length thereof; wherein the holes provide for selective attachment of the one or more stretcher receivers at a variety of heights and spacing widths, such that each set of vertical posts can support one or a plurality of the stretcher receivers.

10. A vehicle for transporting a plurality of patients on stretchers, comprising:

a vehicle having at least one interior compartment; and a first stretcher receiving system according to claim 1.

11. The vehicle of claim 10, further comprising a second stretcher receiving system according to claim 1; the first and second systems are independently secured on opposite sides of the vehicle compartment using said mounting assemblies, whereby an aisle is formed between the systems.

12. The system of claim 1, wherein a distance between the vertical posts of each pair corresponds approximately to the width of the stretcher, and a distance between the two pairs of vertical posts corresponds approximately to the length of the stretcher.

13. A method for converting a vehicle into an ambulance or carrier for transporting a plurality of stretchered persons, comprising:

a) providing a vehicle;

b) removing pre-existing installations in the area designated for installation of at least one adjustable frame assembly;

c) attaching at plurality of mounting assemblies along the ceiling of the compartment;

d) attaching to the mounting assemblies a pair of securement tracks;

e) slidably attaching at least two pairs of vertical posts below the securement tracks using respective connection brackets;

f) sliding a first pair of the vertical posts along the securement tracks to a preferred distance from a second pair of vertical posts;

g) attaching each vertical post to a floor of the vehicle; and h) installing a stretcher receiver between the vertical posts of each pair.

14. The method of claim 13, further comprising:

i) inserting a stretcher into the stretcher receiver.

15. The method of claim 13 where the ceiling of the compartment has a curvature, and the mounting assembly is capable of attaching to multiple points along the curvature of the ceiling in such a manner that the vertical posts can be installed vertically.

16. The method of claim 13 where the stretcher receiver includes a translatable portion for guiding the stretcher in a lateral direction between extended and retracted positions that are horizontally co-planar.

17. The method of claim 13 where the stretcher receiver includes a catch tray positioned to contain any fluids from a stretchered person being supported by the stretcher receiver.

* * * * *